(12) United States Patent
Harris et al.

(10) Patent No.: US 8,422,000 B2
(45) Date of Patent: Apr. 16, 2013

(54) BISTATIC LASER RADAR APPARATUS

(75) Inventors: Michael Harris, Malvern (GB); Christopher Hill, Malvern (GB); Andrew C Lewin, Malvern (GB)

(73) Assignee: QinetiQ Limited, London (GB)

( * ) Notice: Subject to any disclaimer, the term of this patent is extended or adjusted under 35 U.S.C. 154(b) by 1632 days.

(21) Appl. No.: 10/529,055

(22) PCT Filed: Oct. 9, 2003

(86) PCT No.: PCT/GB03/04408
§ 371 (c)(1),
(2), (4) Date: Mar. 24, 2005

(87) PCT Pub. No.: WO2004/034084
PCT Pub. Date: Apr. 22, 2004

(65) Prior Publication Data
US 2006/0061753 A1     Mar. 23, 2006

(30) Foreign Application Priority Data
Oct. 10, 2002 (GB) .................................. 0223512.5

(51) Int. Cl.
*G01C 3/08* (2006.01)
(52) U.S. Cl.
USPC .................. 356/5.01; 356/3.05; 356/3.12
(58) Field of Classification Search ................. 356/4.05; 342/3–5.15
See application file for complete search history.

(56) References Cited

U.S. PATENT DOCUMENTS

| | | | |
|---|---|---|---|
| 3,554,646 A * | 1/1971 | Carlson | ........................ 356/3.02 |
| 4,248,532 A | 2/1981 | Nosler | |
| 4,304,487 A | 12/1981 | Odone et al. | |
| 4,419,011 A | 12/1983 | Matsuda et al. | |
| 4,652,122 A * | 3/1987 | Zincone et al. | ............... 356/28.5 |
| 4,963,017 A * | 10/1990 | Schneiter et al. | ............ 356/3.06 |
| 5,082,362 A * | 1/1992 | Schneiter | ..................... 356/3.03 |
| 5,280,332 A * | 1/1994 | Tocher et al. | ................. 356/3.15 |
| 5,744,793 A | 4/1998 | Skell et al. | |

(Continued)

FOREIGN PATENT DOCUMENTS

| | | |
|---|---|---|
| DE | 4304815 A | 8/1994 |
| DE | 199 33 877 A | 1/2001 |
| EP | 0 596 865 A | 5/1994 |
| GB | 2149993 A | 6/1985 |
| WO | 01/35117 A1 | 5/2001 |

OTHER PUBLICATIONS

International Search Report of PCT/GB03/04408.
GB Search Report of GB 0223512.5.

*Primary Examiner* — Timothy A Brainard
(74) *Attorney, Agent, or Firm* — Nixon & Vanderhye P.C.

(57) ABSTRACT

A bistatic laser radar (lidar) device is described that comprises a transmit channel (60) for forming a focused transmit beam, and a receive channel (62) for forming a focused receive beam. The device is arranged such that the focus of the transmit beam and the focus of the receive beam fall on a common axis when focused to a distance within the operable distance range of the device. The device may be used for vibrometry, wind speed measurements and the like. Implementation of such a device using optical fiber based components is described.

20 Claims, 3 Drawing Sheets

U.S. PATENT DOCUMENTS

| | | |
|---|---|---|
| 5,875,024 A | 2/1999 | Seelhorst et al. |
| 5,949,531 A * | 9/1999 | Ehbets et al. ................ 356/5.01 |
| 6,323,941 B1 * | 11/2001 | Evans et al. ................. 356/4.01 |
| 2002/0075472 A1 * | 6/2002 | Holton ........................ 356/4.01 |
| 2002/0093641 A1 * | 7/2002 | Ortyn et al. ..................... 356/28 |
| 2002/0164110 A1 * | 11/2002 | Neukermans et al. .......... 385/18 |
| 2003/0184729 A1 * | 10/2003 | Bowers ........................... 356/5.1 |
| 2003/0193658 A1 * | 10/2003 | Uomori et al. ................. 356/3.1 |

* cited by examiner

BISTATIC LASER RADAR APPARATUS

This application is the US national phase of international application PCT/GB2003/004408 filed 9 Oct. 2003 which designated the U.S. and claims priority of GB 0223512.5, filed 10 Oct. 2002, the entire contents of each of which are hereby incorporated by reference.

This invention relates to laser radar (lidar) apparatus and more particularly to bistatic coherent laser radar (CLR) apparatus.

Lidar devices are well known, and have been used for a variety of purposes for many years. The basic principle of lidar is to direct a laser beam to a remote target and to detect the returned signal. Modulation of the amplitude of the transmitted laser beam allows simple range information to be determined. Furthermore, the use of coherent laser radar (CLR) permits the measurement of any Doppler shift in the frequency of the returned signal thereby enabling information on the relative speed of the target to be measured. Differential absorption lidar (DIAL) devices are also known in which laser light of two wavelengths is transmitted to a target and the difference in absorption of the first and second wavelengths is used to provide a measure of the molecular concentration of a particular gas species.

CLR devices have been widely used for velocimetry measurements of both soft and hard targets. For example, CLR vibrometry has been used to measure the vibration characteristics of hard targets such as engine casings. CLR has also been used for Doppler wind-speed measurements. In the case of wind speed measurements, the returned signal arises from back-scatter of the transmitted laser beam off small particles (aerosols) such as dust and water droplets. Doppler wind speed measurements have been shown to be useful in a wide range of applications including meteorology, aircraft true airspeed, and detection of aircraft wake vortices.

Measurement of the Doppler frequency shift to a high accuracy is typically achieved in CLR devices by beating (heterodyning) the return signal with a stable local-oscillator beam, usually derived from the same laser as the transmit beam. An example of an optical fibre based CLR system is described in Karlsson et al, Applied Optics, Vol. 39, No. 21, 20 July 2000.

It is possible to broadly categorise lidar systems as being monostatic or bistatic. Monostatic lidar systems are so called because they have common transmit and receive optics. Bistatic lidar systems derive their name from having separate transmit and receive optics.

In a monostatic system, spatial resolution is achieved by focusing the combined transmit/receive beams to the target. In practice, it has been found that diffraction restricts monostatic CLR systems to operation within ranges of a few hundred metres. More-over, slow drop-off in sensitivity away from the focus can result in a poorly defined probe volume. In the case of wind velocity measurements, clouds, smoke or other objects away from the probe volume may result in the generation of spurious reflections. In the case of monostatic CLR systems, it has also been found that internal parasitic reflections from the common transmit/receive optics significantly degrade system performance making such systems unsuitable for some long-range applications (e.g. vibrometry) in which a low intensity return signal is detected.

In contrast to monostatic systems, bistatic CLR systems have been found to be well suited to longer range vibrometry and some wind-speed measurements. The non-parallel transmit and receive beams can be arranged to intersect at a certain point thereby accurately defining a probe volume (e.g. an area in space or the surface of a hard target). Although confinement of the probe volume may lead to a reduction in the strength of the returned signal for distributed targets, the noise generated by spurious reflections is greatly reduced compared with monostatic systems.

To obtain optimum performance from bistatic lidar systems, the transmitted and received beam foci must coincide with the location of beam intersection. This is because the transmit and receive optics must be separately focused and also adjusted in angle (i.e. "squinted") to ensure intersection of focused receive and transmit beams at the desired range. It should be noted that herein the term receive beam is used to denote the region from which any returned light will be directed to the detector. In other words the receive beam is not a beam of photons, but a pseudo or virtual beam that defines the area from which light is received by the system.

A method of aligning a bistatic CLR prior to taking a measurement is described in WO01/35117. However, it can be seen that whenever the range of the equipment is altered it is necessary to recalibrate the system alignment using the alignment method. The requirement to perform a calibration step each time the system range is altered greatly reduces the flexibility and user-friendliness of the lidar system.

It is an object of the present invention to mitigate at least some of the disadvantages of bistatic lidar devices described above.

According to the present invention, a bistatic laser radar device comprises a transmit channel for forming a focused transmit beam, and a receive channel for forming a focused receive beam, wherein the device is arranged such that the focus of the transmit beam and the focus of the receive beam fall on a common axis when focused to a distance within the operable distance range of the device.

The present invention thus provides a bistatic lidar device in which squint is adjusted in a predetermined manner as the focus of the transmit and receive beams are varied. This allows, over the required distance range at which the device operates, the foci of the transmit and receive beams to intersect.

In other words, the location of the transmit beam focus position will trace a first axis over the operable distance of the device. The receive beam focus position will trace a second axis as its focus position is changed within the operable distance range of the device. The present invention ensure that the first axis and the second axis are substantially coincident within the operable range of the device; i.e. the foci of the transmit beam and the receive beam fall along a common axis. It should be noted that the common axis may, or may not, be linear depending on the exact geometry employed.

As described above, device performance is optimised when the foci of the transmit and receive beams intersect at the desired remote target. An advantage of the present invention over prior art bistatic lidar devices is thus the removal of the requirement to perform a separate squint adjustment step whenever the focus of the transmit and receive beams is altered.

Conveniently, the transmit channel comprises a first optical arrangement configured to form the focused transmit beam and having at least one lens. The first optical arrangement may be a single lens or may comprise a telescopic lens system.

Preferably, laser radiation is passed to the first optical arrangement via a transmit optical fibre cable. Hence, the focus of the transmit beam is adjustable by variation of the relative position of the first optical arrangement with respect to the exit aperture of the transmit optical fibre cable.

Advantageously, the fibre exit aperture is linearly translatable with respect to the first optical arrangement. For example, the fibre optic cable end (i.e. the exit aperture) could be mounted on a linear translation stage and moved with respect to a fixed first optical arrangement (e.g. a lens).

Conveniently, the receive channel comprises a second optical arrangement configured to form the focused receive beam and having at least one lens. The second optical arrangement is preferably configured to couple received radiation in to a receive optical fibre cable.

Preferably, the focus of the receive beam is adjustable by variation of the relative position of the second optical arrangement with respect to the entry aperture of the receive optical fibre Advantageously, the fibre entry aperture is linearly translatable with respect to the second optical arrangement. For example, the fibre optic cable end (i.e. the entry aperture) could be mounted on a linear translation stage and moved with respect to a fixed second optical arrangement (e.g. a lens).

Conveniently, in the case of a device having a receive channel in which a fibre end is linearly translatable to the second optical arrangement and a transmit channel in which the fibre end is linearly translatable to the first optical arrangement, the exit aperture of the transmit optical fibre is linearly translatable along the optical axis of the first optical arrangement, and the entry aperture of the receive optical fibre is linearly translatable along an axis arranged at a predetermined angle to the optical axis of the second optical arrangement.

The ability to implement the present invention using a pair of linear translation stages (i.e. one stage to provide transmit beam focus and a second stage to provide receive beam focus with squint correction) provides an advantage over typical prior art devices.

Advantageously, the predetermined angle is calculated from the inverse tangent of the ratio of the separation of the transmit channel and receive channel to the focal length of the optical arrangement. A detailed description of how the predetermined angle is calculated is described below with reference to FIG. 3.

Preferably, the device may further comprise at least one additional receive channel.

In certain circumstances, it is desirable to provide a lidar system having two or more receive channels. For example, in the case of vibrometry measurements made from a hard reflective or light scattering surface (e.g. a window or wall) the laser speckle pattern may produce reflections having an intensity that varies significantly with the angle of observation. A single receive channel could thus be located in a null region and only receive a small return signal. Providing additional receive channels mitigates this problem, as a return signal will be detected by each of the two or more spatially separated receive channels. The two or more returned signals can be combined (e.g. averaged in some way) or the higher intensity signal could be used to provide the required information.

Advantageously, the at least one additional receive channel provides at least one additional receive beam and the focus of the at least one additional receive beam is arranged to intersect the focus of the transmit beam within the operable distance range of the device.

Preferably, the device configured to interact with a distributed (soft) target. For example, the target could be a volume of air and wind speed measurements could be extracted from the device.

Alternatively, the device may advantageously be configured to interact with a hard target. The device may be used, for example, in vibrometry. For example, vibrations of machinery could be monitored in order to identify the onset of failure.

Preferably, the transmit beam is formed from radiation having a wavelength in the region of 1.55 μm. The device may, of course, be operated using radiation of any wavelength (e.g. infrared, visible, UV etc).

The invention will now be described, by way of example only, with reference to the following drawings in which;

FIG. 1 demonstrates the focus and squint properties of a bistatic lidar,

Figure 1C:
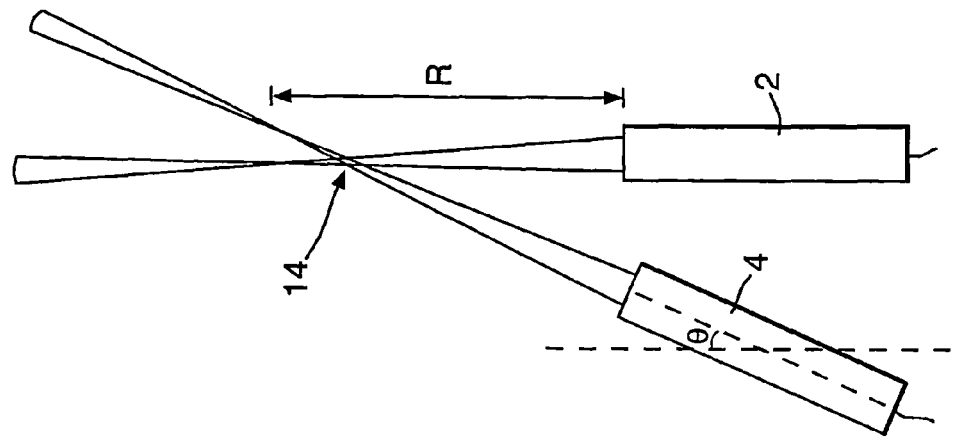
Figure 1B:
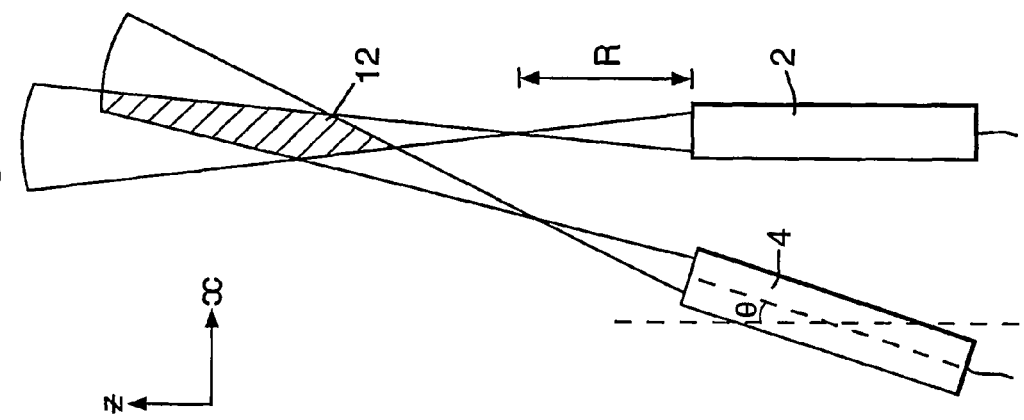
Figure 1A:
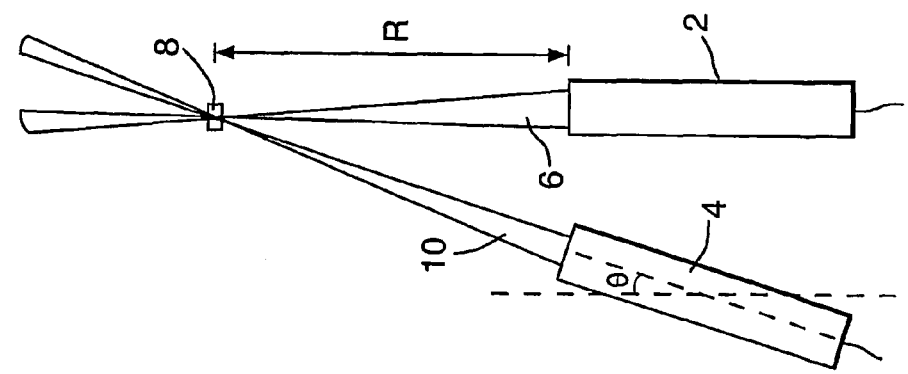

Referring to FIG. 1a, the transmitter 2 and receiver 4 of a bistatic lidar device are shown. The transmitter is configured to transmit a laser beam 6 that is focused on a probe volume 8. Similarly, the receiver 4 is configured to be focused on the same probe volume 8; in other words the so-called receive beam 10 of the receiver is also focused on the probe volume 8. Furthermore, the receiver 4 is tilted away from the z-direction by an angle θ so that the focus of the receive beam 10 intersects the focus of the laser beam 6 at the probe volume 8.

The system of FIG. 1a thus shows a properly aligned bistatic lidar. The foci of the beams from the transmitter and receiver are co-incident at the probe volume 8.

FIG. 1b illustrates the effect of altering only the foci of the transmitter and receiver of the lidar system of FIG. 1a. It can be seen that although the range to the focus (R) of the transmitter and receiver is shortened, the return signal can only be derived from the region of intersection 12. This reduces the sensitivity of the system.

Referring to FIG. 1c, the effect of altering only the relative angle between the transmitter and receiver of the system of FIG. 1a is shown. It can be seen that the return signal will actually be derived from the region of intersection 14, which is at a shorter range than the point of focus of the transmitter and receiver, Again this reduces the sensitivity of the system.

FIG. 1 illustrates why both the focus and the squint of a bistatic system must be carefully adjusted so as to define the required probe volume. WO01/35117 describes a technique that has been developed to enable accurate alignment of the transmit and receive beam at a desired probe volume. The method of WO01/35117 involves detaching a section of the receiver optics, and directing a laser beam down the receiver so that a "real" receive beam is formed that precisely matches the spatial light mode into which light must be scattered in order to be detected by the receiver. The receiver and transmitter can then be focused and squinted so that the "real" receive beam and transmit beam intersect and are focused on the desired probe volume.

Referring to FIG. 2, a typical prior art method for varying the focus and squint of a fibre based bistatic lidar apparatus is shown.

Figure 2A:
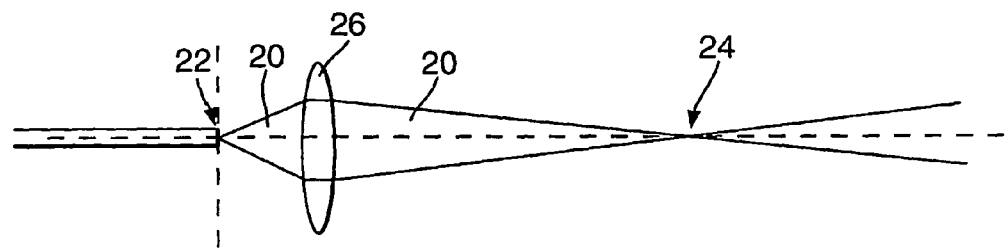
FIG. 2 shows a technique for focusing and squinting an all fibre lidar.
Figure 2B:
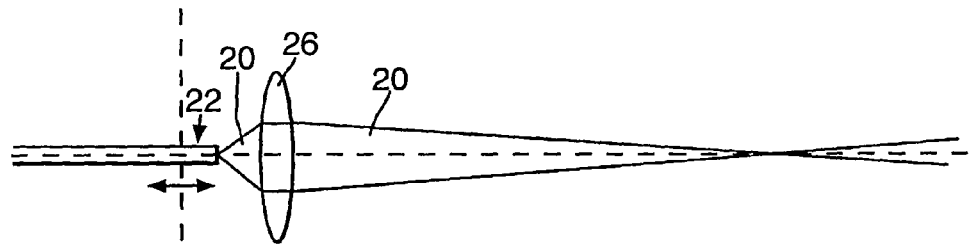
Figure 2C:
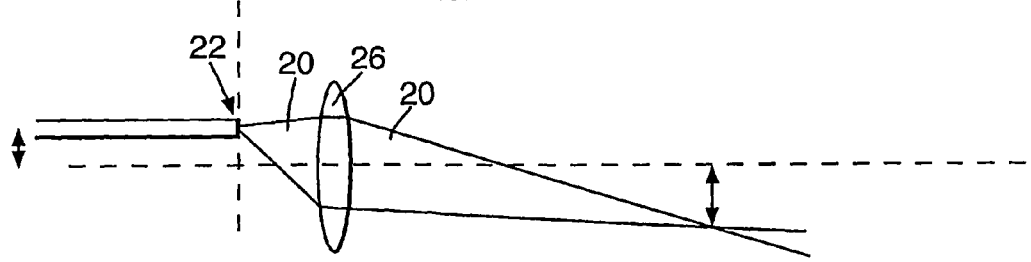

FIG. 2a illustrates how a beam of laser light 20 emitted from a fibre end 22 can be focused to a point 24 by a lens 26. FIG. 2b shows how axial movement (i.e. along the z-axis in FIG. 2) of the fibre toward the lens can increase the range at which the laser beam is focused. FIG. 2c demonstrates how lateral movement of the fibre end with respect to the lens can also provide a lateral movement of the focal point. Control of such lateral movement permits the required amount of squint to be introduced. The required lateral and axial translations can be provided by separate manual (e.g. micrometer) or automated (e.g. motorised translation stage) means.

As described above, the requirement to separately adjust the focus and squint of the system to ensure optimal overlap of the transmit beam and the receive beam on the target adds complexity to the system.

Figure 3:
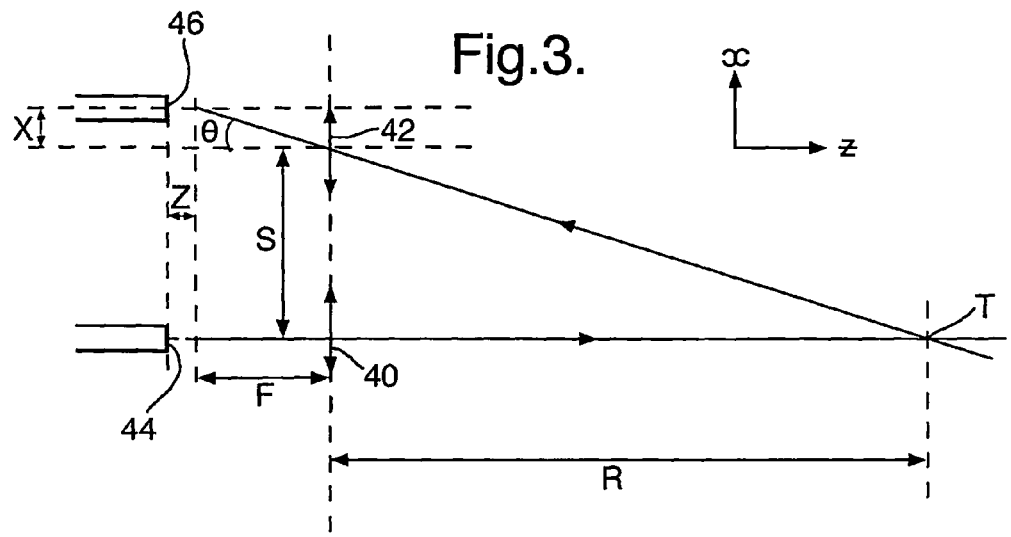
FIG. 3 shows the geometry of a bistatic lidar.

Referring to FIG. 3, it is demonstrated how the present invention implemented for a fibre based lidar system permits the squint and focus adjustments to be combined in a single linear translation that ensures precise squint compensation as the focus is adjusted.

Consider a bistatic system in which a transmit lens 40 is laterally separated from a receive lens 42 by a distance S. The optical axes of the transmit and receive lenses are both aligned along the z-axis. Each lens has a focal length F, and a remote target T is located at a range R from the lenses.

A first fibre end 44 is located a distance F+Z from the transmit lens 40, and a second fibre end 46 is located a distance F+Z from the receive lens 42. To provide squint, the second fibre end 46 is located a distance X away from the optical axis of the receive lens 42.

Hence, the focus condition of the system can be described using the expression;

$$\frac{1}{F+Z} + \frac{1}{R} = \frac{1}{F} \quad (1)$$

This expression can be re-written as;

$$Z = \frac{RF - RF + F^2}{R - F} = \frac{F^2}{R - F} \quad (2)$$

As an approximation, it can be seen that;

$$Z \approx \frac{F^2}{R} \quad (3)$$

For an axial movement of Z=15 mm, and assuming a focal length of 15 cm, the minimum range of the system is 1.5 m.

The required amount of squint as a function of range is given by the expression;

$$\frac{S}{R} = \frac{X}{F} \quad (4)$$

Hence, it can be seen that;

$$X = \frac{F \cdot S}{R} \quad (5)$$

For a range of 1.5 m (i.e. the minimum range of the system as derived from equation 3 above) a required lateral movement (X) of 8 mm is required.

Therefore, the present invention lies in the realisation that both X and Z vary with the inverse of the range (R). In other words, it has been found to be possible to achieve focus and squint with a single linear adjustment of the fibre end of the receive optics. The angle (θ) at which a linear adjustment of the fibre end would result in both the desired focus and squint change can be calculated as;

$$\tan\theta = \frac{X}{Z} = \frac{F \cdot S}{R} \cdot \frac{R}{F^2} \approx \frac{S}{F} \quad (6)$$

Thus, in the case of S=8 cm and F=15 cm an angle (θ) of approximately 28° would be required.

It should be noted that the angle (θ) calculated using equation (6) assumes that the range R is significantly greater than the focal length F of the lens. Equation (6) thus starts to break down when the range at which the beams are focused becomes comparable with the focal length.

For light of wavelength λ and having a radius r at the exit aperture, the lateral displacement (ΔL) error required to introduce a 3 dB loss is given by;

$$\Delta L_{3dB} \approx \pm \frac{R^2}{\pi r^2} \lambda \quad (7)$$

Hence, the minimum range of operation of the system (i.e. the range where the loss is greater than 3 dB) is given by;

$$R \approx r \cdot \sqrt{\frac{\pi \cdot \Delta L}{\lambda}} \quad (8)$$

A beam of radius 1.8 cm at the exit aperture having a wavelength of 1.55 μm would thus provide a squint error less than 3 dB for all ranges greater than about ten metres.

It can thus be seen that alignment of the present invention remains close to optimum for longer range (i.e. beyond around 20 m) applications such as vibrometry. However, some deterioration in sensitivity is encountered at short range (i.e. less than around 10 m) due to the increased importance of higher-order terms in the focus calculation.

The scheme would normally be implemented with zero squint on the transmit beam, and with the receive fibre mounted on a translation stage aligned diagonally to the optical axis of the receive lens. Alternatively, the T and R modes can be equally squinted in opposing directions by half the amount in the preceding version. In each of these methods, the number of translation stages is reduced from three (two focus and one squint) to two (one focus and one focus/squint, or two focus/squint).

The benefits of the present invention are increased when more than one receiver aperture is employed; for example in a dual-receiver or multiple receiver system.

Referring to FIG. 4, a fibre based lidar system according to the present invention is shown. The bistatic lidar system comprises a transmit channel 60 and a receive channel 62. The transmit channel 60 comprises a first fibre end 64 mounted on a first linear translation stage 66. A first lens 68 is provided to focus light exiting the first fibre end 64 to a remote target 70. The receive channel 62 comprises a second fibre end 72 mounted on a second linear translation stage 74. The axis of the second linear translation stage 74 is oriented at an angle θ to the optic axis of a second lens 76 that is provided to collect light returned from the remote target.

Figure 4A:
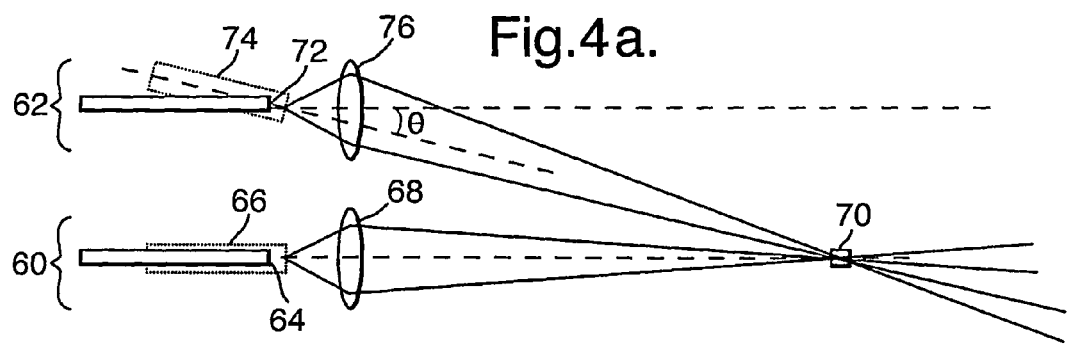
FIG. 4 illustrates a bistatic lidar according to the present invention.
Figure 4B:
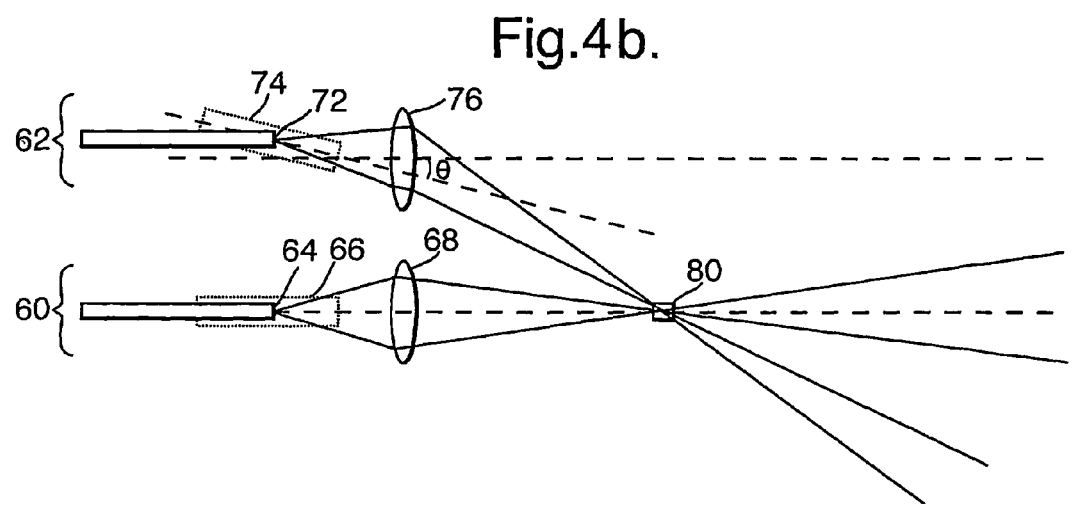

FIG. 4a illustrates the lidar system configured to interrogate a first target volume 78, whilst FIG. 4b illustrates the lidar system when configured to interrogate a second target volume 80. The angle θ is selected using the criteria set forth with reference to FIG. 3 above such that the linear translation used to change the focus of the transmit and receive channels inherently causes a change in the squint of the system. This ensures that, for a given range of target distances, the transmit and receive beams are both focused and arranged to intersect at the required remote target.

As described above, the ability to make a single adjustment to each of the receive transmit channels to vary both the focus and squint of the system is quite advantageous. The present invention permits the range of the system to be varied whilst ensuring continued intersection of the transmit and receive beams. The requirement of prior art devices for the calibration of beam foci and intersection for each range at which the lidar is to be used thus becomes redundant.

In non-fibre based lidar systems a focus effect can be achieved by the movement of a lens along the optical axis of the transmitter and receiver telescopes. Translation of a lens away from the optical axis of the telescope can also be used to adjust the squint of the beam produced by that telescope. A skilled person would recognise that the present invention could also be applied to systems based on free space optics (i.e. non-fibre based). In other words, a linear translation of a telescope lens along a path at a given angle to the optical axis of the telescope could provide integral squint and focus correction in a similar manner to that described above for fibre based devices.

The invention claimed is:

1. A bistatic laser radar device comprising:
    a transmit channel for forming a variable focus transmit beam, and
    a receive channel for forming a variable focus receive beam, wherein the device is arranged such that all points of focus of the transmit beam and all points of focus of the receive beam fall on a common axis within the operable distance range of the device.

2. A device according to claim 1 wherein the transmit channel comprises a first optical arrangement configured to form the focused transmit beam and having at least one lens.

3. A device according to claim 2 wherein laser radiation is passed to the first optical arrangement via a transmit optical fibre cable.

4. A device according to claim 3 wherein the focus of the transmit beam is adjustable by variation of the relative position of the first optical arrangement with respect to the exit aperture of the transmit optical fibre cable.

5. A device according to claim 4 wherein the exit aperture is linearly translatable with respect to the first optical arrangement.

6. A device according to claim 2 wherein the receive channel comprises a second optical arrangement configured to form the focused receive beam and having at least one lens.

7. A device according to claim 6 wherein the second optical arrangement is configured to couple received radiation in to a receive optical fibre cable.

8. A device according to claim 7 wherein the focus of the receive beam is adjustable by variation of the relative position of the second optical arrangement with respect to the entry aperture of the receive optical fibre.

9. A device according to claim 8 wherein the entry aperture is linearly translatable with respect to the second optical arrangement.

10. A device according to claim 9 in which the exit aperture of the transmit optical fibre is linearly translatable along the optical axis of the first optical arrangement, and the entry aperture of the receive optical fibre is linearly translatable along an axis arranged at a predetermined angle to the optical axis of the second optical arrangement.

11. A device according to claim 10 wherein the predetermined angle is calculated from the inverse tangent of the ratio of the separation of the transmit channel and receive channel to the focal length of the optical arrangement.

12. A device according to claim 1 and further comprising at least one additional receive channel.

13. A device according to claim 12 and comprising at least one additional receive channel to provide at least one additional receive beam, wherein the focus of the at least one additional receive beam is arranged to intersect the focus of the transmit beam within the operable distance range of the device.

14. A device according to claim 1 wherein the device configured to interact with a soft target.

15. A device according to claim 1 wherein the device configured to interact with a distributed target.

16. A device according to claim 1 wherein the transmit beam is formed from radiation having a wavelength in the region of 1.55 μm.

17. A bistatic laser radar device comprising:
    a transmit channel for forming a variable focus transmit beam, and
    a receive channel for forming a variable focus receive beam, wherein the device is arranged such that all points of focus of the transmit beam and all points of focus of the receive beam fall on a common axis within the operable distance range of the device, wherein each of said channels vary focus by movement along a movement axis and said movement axes are not parallel.

18. A device according to claim 17, wherein said movement axes define an acute angle.

19. A device according to claim 18, wherein each of said channels has an optical lens with a focal length F, one of said channels is displaced from the other of said channels by a distance S, said acute angle is $\theta$ and $\theta$ is defined by the equation: $\tan\theta \approx S/F$.

20. A bistatic laser radar device comprising:
    a transmit channel for forming a variable focus transmit beam, and
    a receive channel for forming a variable focus receive beam, wherein the device is arranged such that all points of focus of the transmit beam and all points of focus of the receive beam fall on a common axis within the operable distance range of the device, wherein said channels are separated by a distance S and each of said channels have a lens having a focal length of F and vary focus by movement along a respective movement axis, wherein one of said movement axes define an acute angle $\theta$ with respect to the other of said movement axes and wherein $\tan\theta \approx S/F$.

* * * * *